United States Patent Office 2,768,110
Patented Oct. 23, 1956

2,768,110

ISOTHIOUREA COMPOUND FUNGICIDAL COMPOSITIONS AND METHOD OF CONTROLLING FUNGI

Johannes Thomas Hackmann, Amsterdam, Netherlands, assignor to Shell Development Company, Emeryville, Calif., a corporation of Delaware No Drawing. Application April 12, 1954,
Serial No. 422,689

Claims priority, application Austria August 20, 1953

9 Claims. (Cl. 167—22)

This invention relates to fungicidal compositions and to a method of controlling fungi, particularly on plants.

It has now been found that completely substituted isothioureas having at least 6 carbon atoms in the molecule are particularly suitable as foliage fungicides.

More specifically, it has been found that N,N,N'-trihydrocarbyl-S-hydrocarbyl isothioureas of at least 6 carbon atoms are effective foliage fungicides.

The compounds which are preferred for use in the invention can be represented by the following general structural formula:

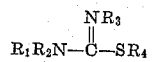

wherein $R_1$, $R_2$, $R_3$, and $R_4$ represent hydrocarbon radicals of preferably not more than about 14 carbon atoms. It is particularly desirable that $R_4$ not exceed 14 carbon atoms since it has been found that the fungicidal activity of the compounds decreases substantially as the number of carbon atoms of $R_4$ exceeds 14. Preferably, the isothiourea derivatives should contain not more than about 45 carbon atoms per molecule. Particularly outstanding results have been obtained with isothiourea derivatives of the above formula wherein $R_1$, $R_2$ and $R_3$ are the methyl or phenyl radical and $R_4$ is an alkyl radical of not more than about 12 carbon atoms.

Typical representative isothiourea derivatives which can be used in the invention include: N,N-dipropyl-N'-phenyl-S-butyl isothiourea; N-methyl-N-phenyl - N' - n-hexyl-S-ethyl isothiourea; N,N-diphenyl-N'-n-pentyl-S-phenyl isothiourea; N,N,N'-trimethyl-S-n-octyl isothiourea; N,N,N'-trimethyl-S-n-hexyl isothiourea; N-phenyl-N,N'-dimethyl-S-ethyl isothiourea; N,N-dimethyl-N'-phenyl-S-propyl isothiourea; N,N,N'-trimethyl-S-n-decyl isothiourea; N,N-diphenyl-N'-methyl-S-n-octyl isothiourea; N,N-diethyl-N'-phenyl-S-n-heptyl isothiourea; N,N'-diisopropyl-N-methyl-S-amyl isothiourea; N,N-diisobutyl - N' - phenyl-S-isopropyl isothiourea; N,N,N'-trimethyl - S - (2-ethylhexyl) isothiourea; N,N - dimethyl - N' - cyclohexyl-S-ethyl isothiourea; N,N'-diphenyl-N-methyl-S-nonyl isothiourea; N,N,N'-triethyl-S-phenyl isothiourea; N-phenyl-N,N'-dimethyl-S-n-octyl isothiourea; N-phenyl-N,N'-diethyl-S-n-octyl isothiourea; N,N-dimethyl-N'-phenyl-S-isobutyl isothiourea; N,N - dimethyl - N' - phenyl-S-(3,5,5-trimethylhexyl) isothiourea, and the like.

Although S-alkyl isothioureas having only hydrogen substituents on the nitrogen atoms have been known to be disinfectants and preservatives, these compounds are not suitable for use as foliage fungicides because they are unstable and decompose under the conditions of use. The isothiourea derivatives of the invention are stable at temperatures as high as about 115° C.

The present isothiourea derivatives can be prepared by reacting an N,N'-substituted thiourea which can be represented by the following general formula:

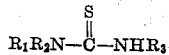

wherein $R_1$, $R_2$, and $R_3$ have the same meanings as above, which thiourea derivative can react in its isomeric form, with a compound having the formula $R_4X$ wherein $R_4$ has the same meaning as above and X represents a halogen atom, such as chlorine, bromine or iodine, or a hydroxy radical.

The preparation of the present isothiourea derivatives is illustrated by the following example:

Example 1

A mixture of 39.3 grams (⅓ mole) of trimethyl thiourea, which was prepared by the process described by Lecher and Graf in Berichte, 56, Part 1 (1923), page 1328, 64.3 grams (⅓ mole) of n-octyl bromide and 300 cc. of absolute alcohol were heated under reflux for 2 hours. Two hundred fifty cc. of alcohol was then distilled off and the residue poured out into 750 cc. of water. The rather turbid solution was extracted twice with 100 cc. of ether. A solution of 16 grams NaOH in 50 cc. of water was added to the aqueous phase, whereupon an oily substance separated off, which was absorbed into ether. After the material had been dried and the ether distilled off under vacuum, the N,N'-trimethyl-S-n-octyl isothiourea distilled over at 0.6 mm. of mercury pressure and at a temperature of 110–112° C. The yield was 57 grams, that is, 75% of theoretical. The nitrogen content was found to be 12.1% (calculated at 12.3%).

N,N,N'-trimethyl-S-n-hexyl isothiourea having a boiling point at 1 mm. Hg of 95° C. and a nitrogen content of 13.7% (calculated as 13.9%) and N-phenyl-N-methyl-N'-methyl-S-ethyl isothiourea having a boiling point at 1 mm. Hg of 109–111° C. and a nitrogen content of 13.5% (calculated as 13.5%) were prepared in similar fashion.

The present fungicidal agents show a surprisingly small degree of specificity in their effect. It is obvious that this is of great practical importance because it is more economical to use the same agent for combating different varieties of fungi than to have to maintain a large stock of many specifically acting materials.

The fungicidal agents of the invention can be employed for the treatment of plants, animals or inanimate organic materials which are subject to attack by fungi, but they are particularly suitable for the treatment of plants. They are preferably applied to the plants to be treated by spraying, but good results can also be obtained by the employment of dusts which are prepared by admixing the isothiourea derivatives with a finely divided, inert solid material, such as chalk, talc, clays, and the like.

For spraying purposes, the isothiourea derivatives can be utilized in aqueous solution, in solution in an organic liquid or in aqueous emulsions obtained by emulsifying in water a solution of the isothiourea derivative in an organic liquid. The amount of the active agent present in the solution or emulsion should be an effective fungicidal amount and is usually from about 0.01% to about 1% by weight, and preferably from 0.05% to 0.5% by weight. Application rates are generally of from about 75 to about 150 gallons per acre. If spraying is effected with much smaller volumes of solution or emulsion ("low volume spraying"), higher concentrations of the active agent should be employed. If the plants to be treated are dipped, together with their root systems, in a solution or emulsion of the active agent, which treatment is especially recommended for members of the Cucurbitacaea family, much smaller concentrations of the active agent can be employed, preferably from about 0.01% to 0.05%. In this type of treatment, the duration of treatment is about several hours.

The completely substituted isothioureas are most effectively applied when in solution in organic solvents, particularly in a mineral oil such as kerosene, diesel oil and light lubricating oils such as spindle oil. Preferably, such solutions are emulsified in water with the aid of an emulsifying agent. In order to insure safety from phytotoxic activity, the mineral oil employed should have an unsulfonatable residue above about 80% and preferably above about 90%. It is generally advantageous to prepare concentrate compositions containing from about 10% to about 50% by weight of the isothiourea derivative and a minor amount of an emulsifier, for example, from about 5% to about 15% by weight, dissolved in a suitable solvent. The concentrate composition can then be emulsified at or near the point of application, in sufficient water to bring the concentration of the active ingredient down to between about 0.01% and about 1% by weight of the total formulation.

Emulsifiers which can be employed can be either cationic, anionic, or non-ionic. Examples of suitable emulsifiers are sodium petroleum sulfonates, sodium alkyl aryl sulfonates, sodium alkyl sulfates of at least about 12 carbon atoms, sodium sulfosuccinate, ethers from polyethylene glycols and alkylated phenols, mixtures of fatty acid esters of polyethylene glycols, polyoxyethylene lauryl alcohols, dimeric dialkylphenoxypolyethoxyethanols, glyceryl phthalic alkyd resins, polymeric condensation products of alkylene groups and long chain aliphatic amines and amides, etc.

The present isothiourea derivatives need not be employed in a pure condition. Inactive admixtures which have been formed in the commercial preparation thereof can be present. Mixtures of active compounds as can be readily prepared from commercial products are also suitable. They can be used alone or in combination with other fungicidal, viricidal, insecticidal or acaricidal materials, the action of which may be either internal or external, with plant nutritives, with plant hormones and the like.

The invention is illustrated by the following example which is not to be construed as limiting the specification or claims in any manner.

*Example II*

N,N,N'-trimethyl-S-n-hexyl isothiourea; N,N,N'-trimethyl-S-n-octyl isothiourea and N-phenyl-N-methyl-N'-methyl-S-ethyl isothiourea were sprayed in various concentrations on plants attacked by disease as shown in Table I. The results were compared with those obtained by spraying plants with a commercial preparation comprising copperoxychloride (brand Koneprox) in the event of phytophthora and zincdimethyl-dithiocarbamate (brand Dithane Z-78) in the event of rust, which are normally used for controlling such diseases.

The results of the experiments are represented by the relative degree of suppression which is calculated according to the following formula:

$$\frac{\text{Degree of suppression obtained with isothiourea derivative}}{\text{Degree of suppression obtained with commercial preparation}} \times 100$$

The degree of suppression was determined by the following method:

Test plants were sprayed with a solution of the isothiourea derivative until the liquid dropped from the leaves. After the spray liquid dried, usually after about two days, the plants were exposed to contamination with the fungus. Depending on the kind of test plant and of the fungus, contamination was effected either by inoculation of the plant or by placing the plant in contaminated surroundings, for example, in a greenhouse in which plants affected by the fungus were present. Conditions were chosen such that untreated plants soon became diseased. After a certain period had elapsed, depending on the plant tested, the ratio of the affected leaf surface to the total leaf surface was determined for the treated plants. The quantity obtained by subtracting the quotient of these two numbers from one is a measure for the degree to which suppression of the fungus has succeeded. This quantity, expressed in percent, is termed the degree of suppression. The degree of suppression was determined at a time at which untreated plants showed clear symptoms of the disease. As a rule, the leaf surfaces were not measured, but estimated with the required accuracy. An experienced person can in this way determine the degree of suppression with an accuracy of about 5%. This accuracy is sufficient since, in general, results obtained in biological tests are only reproducible within rather wide limits.

TABLE I

| Compound | Concentration in percent by wt. | Disease | Plant | Relative Degree of Suppression | Degree of Infection |
| --- | --- | --- | --- | --- | --- |
| N,N,N'-trimethyl-S-n-hexyl isothiourea. | 0.05 | Phytophthora | Tomatoes | 200 | Medium. |
|  | 0.1 | do | Potatoes | 160 | Do. |
|  | 0.05 | Rust | Cereals | 180 | Do. |
| N,N,N'-trimethyl-S-n-octyl isothiourea. | 0.05 | Phytophthora | Tomatoes | 200 | Do. |
|  | 0.1 | do | Potatoes | 140 | Do. |
|  | 0.05 | Rust | Cereals | 170 | Do. |
| N-phenyl-N-methyl-N'-methyl-S-ethyl isothiourea. | 0.05 | Phytophthora | Tomatoes | 215 | Do. |
|  | 0.1 | do | Potatoes | 135 | Do. |
|  | 0.05 | Rust | Cereals | 155 | Do. |

I claim as my invention:

1. A method of controlling fungi which comprises treating plants subject to attack by fungi which a composition containing N,N,N'-trimethyl-S-n-hexyl isothiourea.

2. A method of controlling fungi which comprises treating plants subject to attack by fungi with a composition containing N,N,N'-trimethyl-S-n-octyl isothiourea.

3. A method of controlling fungi which comprises treating plants subject to attack by fungi with a composition containing N-phenyl-N-methyl-N'-methyl-S-ethyl isothiourea.

4. A method of controlling fungi which comprises treating plants subject to attack by fungi with a composition containing an N,N,N'-trihydrocarbyl-S-alkyl isothiourea having at least 6 carbon atoms and wherein each hydrocarbyl substituent attached to nitrogen atoms contains not more than about 14 carbon atoms and said alkyl substituent contains not more than about 12 carbon atoms.

5. A method of controlling fungi which comprises treating plants subject to attack by fungi which a composition containing an N,N,N'-trihydrocarbyl-S-hydrocarbyl isothiourea having at least 6 carbon atoms and wherein each hydrocarbyl substituent contains not more than about 14 carbon atoms.

6. A composition suitable for controlling fungi comprising N,N,N'-trimethyl-S-n-hexyl isothiourea and an emulsifying agent suitable for dispersing the composition in an aqueous medium.

7. A composition suitable for controlling fungi comprising N,N,N'-trimethyl-S-n-octyl isothiourea and an emulsifying agent suitable for dispersing the composition in an aqueous medium.

8. A composition suitable for controlling fungi comprising N-phenyl-N-methyl-N'-methyl-S-ethyl isothiourea and an emulsifying agent suitable for dispersing the composition in an aqueous medium.

9. A composition suitable for controlling fungi comprising an N,N,N' - trihydrocarbyl - S - hydrocarbyl isothiourea having at least 6 carbon atoms and wherein each hydrocarbyl substituent contains not more than about 14 carbon atoms, and an emulsifying agent suitable for dispersing the composition in an aqueous medium.

References Cited in the file of this patent

UNITED STATES PATENTS

| | | |
|---|---|---|
| 2,156,193 | Puetzer | Apr. 25, 1939 |
| 2,588,428 | Stewart | Mar. 11, 1952 |

OTHER REFERENCES

Bandelin: Journal of the American Chemical Society, vol. 74 (1952), pp. 4271 to 4273.

Kohlrausch: Chemical Abstracts, vol. 34 (1940), p. 4990.

Lecher: Chemical Abstracts, vol. 21 (1921), p. 2878.